(12) United States Patent
Moshelion et al.

(10) Patent No.: US 10,412,901 B2
(45) Date of Patent: Sep. 17, 2019

(54) SYSTEM FOR SELECTING PLANTS FROM AMONG A POPULATION OF PLANTS

(75) Inventors: Menachem Moshelion, Rechovot (IL); Rony Wallach, Karmei Yosef (IL)

(73) Assignee: Yissum Research Development Company of the Hebrew University of Jerusalem Ltd., Jerusalem (IL)

( * ) Notice: Subject to any disclaimer, the term of this patent is extended or adjusted under 35 U.S.C. 154(b) by 832 days.

(21) Appl. No.: 13/126,480

(22) PCT Filed: Nov. 1, 2009

(86) PCT No.: PCT/IL2009/001020
§ 371 (c)(1),
(2), (4) Date: Jul. 20, 2011

(87) PCT Pub. No.: WO2010/049939
PCT Pub. Date: May 6, 2010

(65) Prior Publication Data
US 2011/0270531 A1    Nov. 3, 2011

Related U.S. Application Data

(60) Provisional application No. 61/109,826, filed on Oct. 30, 2008.

(51) Int. Cl.
*G06F 19/00* (2018.01)
*A01G 7/00* (2006.01)
*A01G 2/00* (2018.01)

(52) U.S. Cl.
CPC .................................... *A01G 7/00* (2013.01); *A01G 2/00* (2018.02)

(58) Field of Classification Search
CPC ............ C12N 15/8271; C12N 15/8261; C12N 15/8243; C12N 15/8273; A01G 7/00; A01G 1/00
(Continued)

(56) References Cited

U.S. PATENT DOCUMENTS 1,332,659 A * 3/1920 Bates .............................. 239/44
5,241,786 A * 9/1993 Burns et al. ...................... 47/79
(Continued)

FOREIGN PATENT DOCUMENTS

| WO | 00/58849 A1 | 10/2000 |
| WO | 02/084248 A2 | 10/2002 |
| WO | 2007/128122 A1 | 11/2007 |

OTHER PUBLICATIONS

C.-Y. Xu, V. P. Singh; "Evaluation of three complementary relationship evapotranspiration models by water balance approch to estimate actual regional evapotranspiration in different climatic regions"; Oct. 1, 2004; Jurnal of Hydrology 308 (2005) 105-121.*
(Continued)

*Primary Examiner* — Yoshihisa Ishizuka

(57) ABSTRACT

Provided is a system (1) and method for identifying one or more plants in a population of two or more plants (4). The method includes monitoring one or more parameters of a plant (4) of the population and generating one or more time signals indicative of values of the one or more parameters. The signals are processed to calculate one or both of a transpiration rate of each plant and a rate of change of a transpiration rate over each of one or more time intervals. The plants are then ranked using an algorithm involving the calculated transpiration rates, and plants having a ranking above a predetermined ranking are identified. Further provided is a system for carrying out the method of the invention.

18 Claims, 13 Drawing Sheets

(58) Field of Classification Search
USPC .............................................. 702/19, 57, 81
See application file for complete search history.

(56) References Cited

U.S. PATENT DOCUMENTS

| | | | | |
|---|---|---|---|---|
| 5,375,371 | A * | 12/1994 | Wells | A01G 27/06 47/81 |
| 5,764,819 | A | 6/1998 | Orr et al. | |
| 6,397,162 | B1 * | 5/2002 | Ton | 702/136 |
| 2002/0170229 | A1 * | 11/2002 | Ton et al. | 47/1.7 |
| 2006/0137041 | A1 * | 6/2006 | Masle et al. | 800/287 |
| 2007/0057801 | A1 * | 3/2007 | Hawker | G08B 21/00 340/604 |
| 2007/0208592 | A1 | 9/2007 | Glenn et al. | |
| 2008/0097653 | A1 * | 4/2008 | Kaprielian | A01C 23/042 700/284 |
| 2010/0137140 | A1 * | 6/2010 | Golub | A61K 41/0004 504/187 |
| 2012/0297504 | A1 * | 11/2012 | Granevitze | C07K 14/415 800/281 |

OTHER PUBLICATIONS

Nir Sade et al., Improving plant stress tolerance and yield production: is the tonoplast aquaporin SlTIP2;2 a key to isohydric to anisohydric conversion?, Sep. 2, 2008, New Phytologist, 2009, 181:651-661.*

Walid Sadok and al., Leaf growth rate per unit thermal time follows QTL-dependent daily patterns in hundreds of maize lines under naturally fluctuating conditions, Plant, Cell and Environment (2007).*

Rehfeldt h. "Ranks in Sensory Measurement". "https://web.archive.org/web/20030512085022/http://www.rasch.org:80/rmt/rmt82p.htm", May 12, 2003.*

Zhang, Wei-Qiang, et al., "Comparison on the Transpiration Values Measured with Portable Steady Porometer Method and Whole-tree Weighing Method," Research of Soil and Water Conservation, Dec. 2007, pp. 192-193, vol. 14, No. 6, China Academic Journal Electronic Publishing House.

Sade et al, "The Role of Tobacco Aquaporin1 in Improving Water Use Efficiency, Hydraulic Conductivity, and Yield Production Under Salt Stress", Plant Physiology Jan. 2010 vol. 152 No. 1 245-254, published online before print Nov. 2009, doi: http://www.plantphysiol.org/content/152/1/245.

Sade et al, "Improving plant stress tolerance and yield production: is the tonoplast aquaporin SlTIP2;2 a key to isohydric to anisohydric conversion?", New Phytologist (2009) 181: 651-661, article first published online: Nov. 27, 2008, http://onlinelibrary.wiley.com/doi/10.1111/j.1469-8137.2008.02689.x/abstract.

International Preliminary Report on Patentability for parent PCT Application No. PCT/IL2009/001020, dated May 3, 2011.

Office Action dated Oct. 6, 2014 From the Israel Patent Office Re. Application No. 212539 and Its Translation Into English.

Communication Pursuant to Article 94(3) EPC dated Aug. 2, 2016 From the European Patent Office Re. Application No. 09761025.7.

* cited by examiner

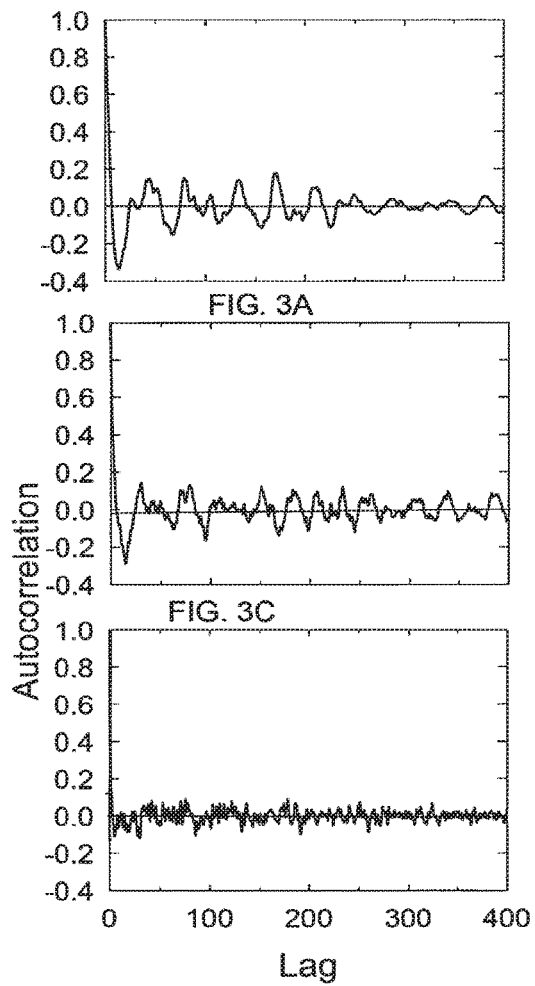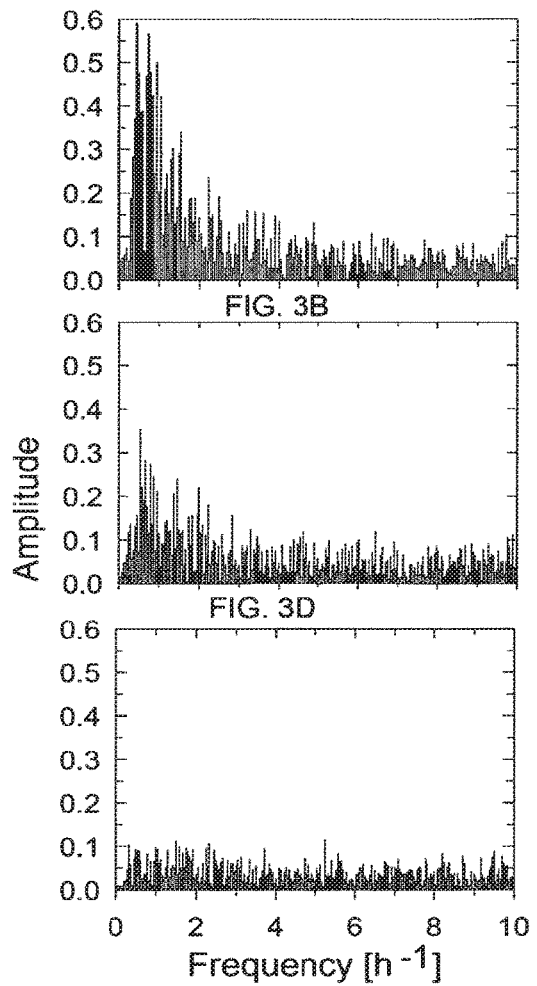

SYSTEM FOR SELECTING PLANTS FROM AMONG A POPULATION OF PLANTS

This is a National Phase Application filed under 35 U.S.C. § 371 as a national stage of PCT/IL2009/001020, filed on Nov. 1, 2009, an application claiming the benefit under 35 U.S.C. § 119(e) of U.S. Provisional Application No. 61/109,826, filed on Oct. 30, 2008, the content of each of which is hereby incorporated by reference in its entirety.

FIELD OF THE INVENTION

This invention relates to methods and systems for use in agriculture.

BACKGROUND OF THE INVENTION

Worldwide development production of new abiotic-stress-resistant cultivars, i.e., those resistant to such stress conditions as drought, extreme temperatures, or salinity, is on the rise, owing to the expansion of agriculture into previously uncultivated areas. Such areas often suffer from low soil fertility, groundwater of variable salinity, sensitivity to water-logging, deterioration of irrigation-water quality, and irrigation with marginal water with high chloride concentrations. The threat of global warming and the associated fluctuations in weather conditions and precipitation levels are expected to accelerate the expansion of agriculture into previously uncultivated areas.

A major and immediate response of many plant species to abiotic stresses is a decrease in growth rate, which eventually leads to a significant decrease in yield. Among the reasons for the reduction in growth rate under abiotic stresses is a decrease in root conductivity, which induces abrupt stomatal closure, leading to decreased rates of transpiration and photosynthesis. Plants are able to cope with abiotic stresses using a variety of stress-defense mechanisms, such as osmotic regulation, antioxidant protection and ion-homeostasis mechanisms, among others. These mechanisms enable plants to complete their life cycle while maintaining some level of yield, even under stress conditions.

Two main approaches have been to cope with theses problem by producing new stress-resistant cultivars. The first is genetic engineering, using various candidate genes, and the second is classical breeding. However, assessing a plants yield under stress conditions is difficult under field conditions because of the spatial variability in the filed of the soil, soil and moisture conditions, salinity, and light intensity.

SUMMARY OF THE INVENTION

The present invention provides a system for simultaneously monitoring transpiration rates in a population of two or more plants and identifying those plants in the population having superior characteristics as determined from their transpiration rates. The transpiration rate of a plant is the rate in which water is lost from the plant by evaporation through the stomata.

The system of the invention comprises two or more monitoring units. Each monitoring unit is configured to monitor the transpiration rate of a plant in the population. Each monitoring unit includes one or more sensors sensing parameters related to the plant and generates a time dependent signal indicative of the measured parameter parameters sensed by the sensor. In a preferred embodiment the plants are potted plants enclosed in a container containing an amount of water that is in fluid communication with the contents of the pot. In this preferred embodiment, the sensors are load cells measuring a mass of the container together with the contents of the container, including the water. Transpiration by a plant causes the amount of water in the container to decrease over time which is reflected in a decrease in the mass sensed by the sensor. Thus by monitoring the mass of each container over a period of time, a transpiration rate over the time period can be calculated. The signals generated by the sensors over time are processed to determine a transpiration rate over one or more time periods. For each time period, the processing may include calculating an average and standard deviation of the transpired water, during this period or the ratio between the transpired water and the plant mass gain during this specific period (known as the "water usage efficiency" or "WUE" of the plant), observed in the population over the time period. The processing further includes ranking each of the plants in the population according to the statistical analysis, for example, ranking the plants according to their transpiration rate and/or according to their WUE. This allows the identification of plants in the population having preferred characteristics.

In one embodiment, the signals are processed over two or more time periods, where each of the two or more time periods is characterized by a set of one or more environmental conditions to which the plant population is exposed. During one time period, the environmental conditions may be "control" environmental conditions, while during another time period the environmental conditions may be "stress" conditions. The conditions can be set back to "control" in order to examine the plants recovery from the "stress". This scenario can be repeated by different combinations of "stresses" and recoveries. The environmental factors that may be altered between the two time periods include, for example, availability of water, humidity, temperature, irradiation, salinity, soil mineral content) as well as biotic parameters such as bacteria in soil and pathogens. For example, plants having a high rate of transpiration under stress environmental conditions may be assigned a higher ranking than plants having a lower transpiration under the same conditions. In this embodiment, the processing may further comprise calculating a rate of change of the transpiration rate upon exposure of the plants to a change in environmental conditions and during the recovery from this stress. The ranking may also involve the rates of change of the transpiration rates detected when the environmental conditions of the plants are altered. Plants in which the transpiration rate decreases slowly when the environmental conditions become more stressful would be assigned a higher ranking than plants whose transpiration decreased more rapidly. Plants in which the transpiration rate increases rapidly when the environmental conditions become less stressful would be assigned a higher ranking than plants whose transpiration increased more slowly.

In one embodiment, the invention is used to identify optimal environmental conditions for growing plants. In this embodiment, in each of two or more time periods, the plants are exposed to different environmental conditions.

Ranking of the plants may be done by any one of several methods, enabling different levels of screening. One method involves a comparison of the accumulated weights of target and control plants over a predetermined time period. The weight gain of each individual plant is compared by statistical tools with the average weight gains of the target plant population and the control plants.

In another method for ranking the plants, the cumulative transpiration is used to provide a measure of the amount of water the plant transpires during a given period by summing the daily transpiration. The cumulative transpiration of each individual plant is compared to the average cumulative transpirations of the target plant population and control plants, and both are compared to the potential transpiration rate (atmospheric demand).

In yet another method, the WUE is determined by the cumulative weight gain during a certain period divided by the cumulative transpiration during that period.

The momentary rate of transpiration may be determined from the measured weight-time series by a sequence of calculations. The data are first smoothed to a certain degree (i.e. subjected to noise reduction) in order to isolate the diurnal transpiration (water loss) trend. The pattern of diurnal transpiration rate is then calculated by the first derivative of the variations in smoothed weight. The peak transpiration rate and its timing for each individual plant are compared with the average peak transpiration rates and timing in the target plant population and control plants, and both are compared to the potential transpiration rate (atmospheric demand); e.g. as shown in FIG. 12).

Thus, in its first aspect, the present invention provides a system for identifying one or more plants in a population of two or more plants, comprising:

(a) two or more monitoring units, each monitoring unit comprising one or more sensors configured to sense one or more parameters of a plant of the population associated with the monitoring unit and generating one or more time signals indicative of values of the one or more parameters; and (b) a processor configured to:
  (i) receive the time signals from the monitoring units and to process the signals to calculate one or both of a transpiration rate or a rate of change of a transpiration rate of the plant associated with each monitoring unit over each of one or more time intervals;
  (ii) rank the plants in the population using an algorithm involving the calculated transpiration rates of the plants;
  (iii) identifying plants having a ranking above a predetermined ranking; and
  (iv) displaying on a display device identifiers of the identified plants; and (c) a display device.

In another or its aspects, the invention provides a method for identifying one or more plants in a population of two or more plants, comprising:

(a) monitoring one or more parameters of a plant of the population associated with the monitoring unit and generating one or more time signals indicative of values of the one or more parameters; and (b) processing the signals to calculate one or both of a transpiration rate or a rate of change of a transpiration rate of the plant associated with each monitoring unit over each of one or more time intervals;

(c) rank the plants in the population using an algorithm involving the calculated transpiration rates of the plants;

(d) identifying plants having a ranking above a predetermined ranking; and (e) displaying on a display device identifiers of the identified plants.

BRIEF DESCRIPTION OF THE DRAWINGS

In order to understand the invention and to see how it may be carried out in practice, embodiments will now be described, by way of non-limiting example only, with reference to the accompanying drawings, in which:

FIGS. 3A, 3C and 3E show the autocorrelation functions for the graphs of FIGS. 2A, 2B, and 2C, respectively;

FIGS. 3B, 3D, and 3F show the spectra for a whole-plant, a submerged wick, and constant-weight residual time series, respectively;

DETAILED DESCRIPTION OF EMBODIMENTS

Figure 11:
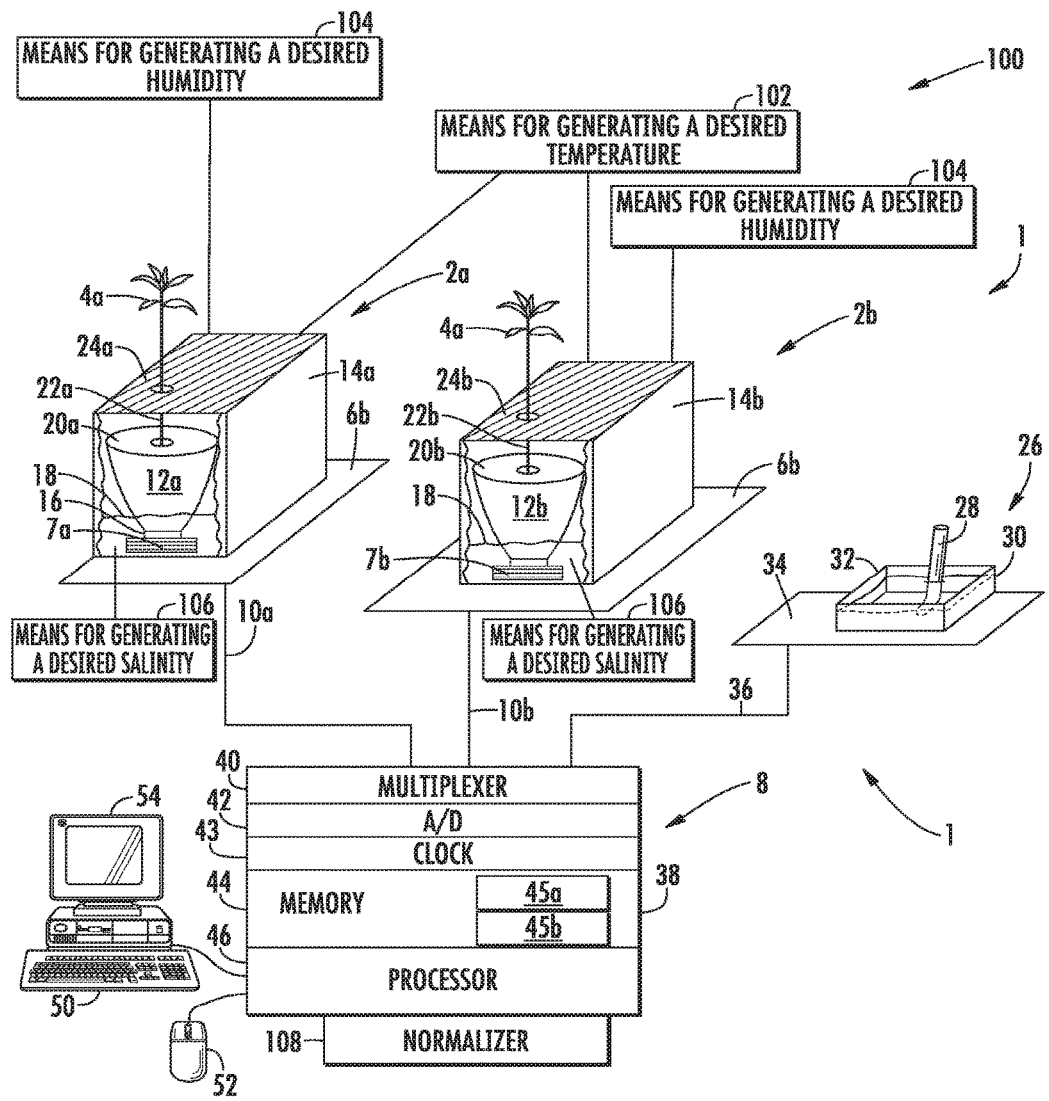
FIG. 11 shows a system for identifying plants in a population of plants in accordance with one embodiment of the invention.
Figure 12A:
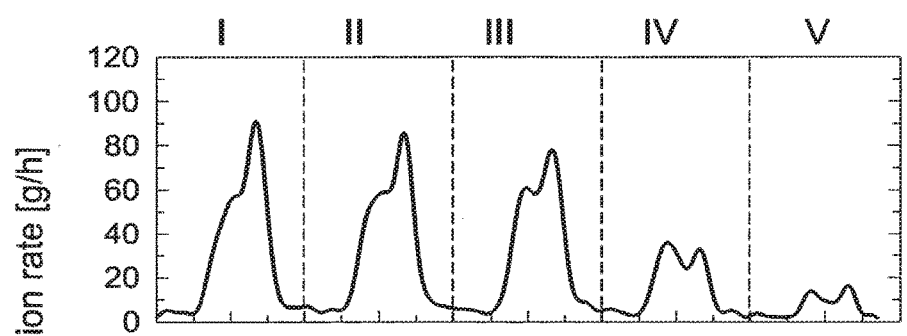
FIG. 12 shows the transpiration rate of two tomato plants during 5 days of dehydration treatment (A and B), compared to a reference (submerged wick) environmental vapor pressure deficit (VPD), presented in C.
Figure 12B:
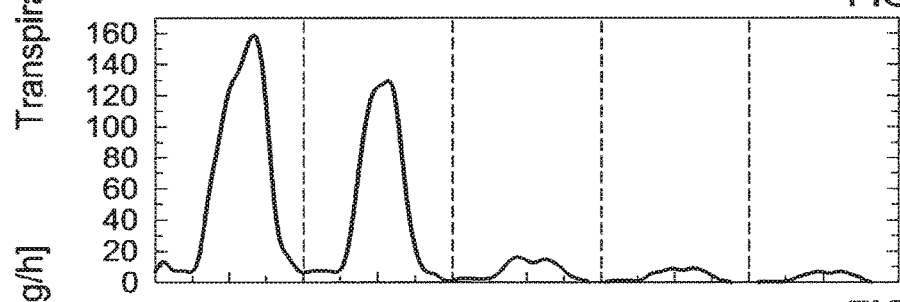
Figure 12C:
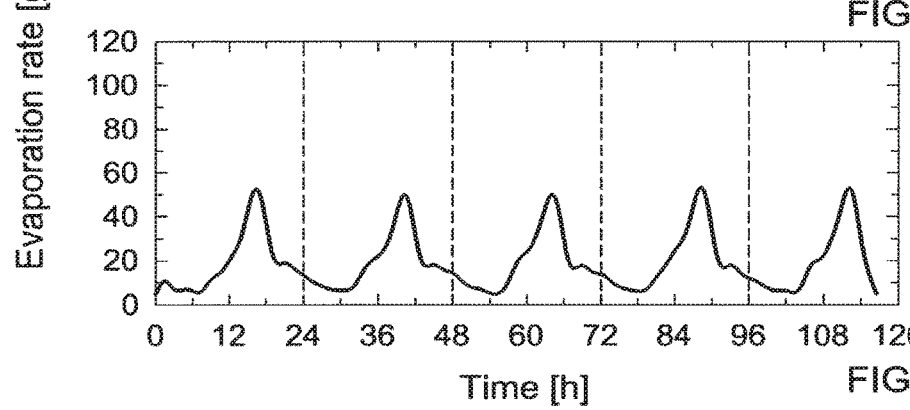
Figure 13:
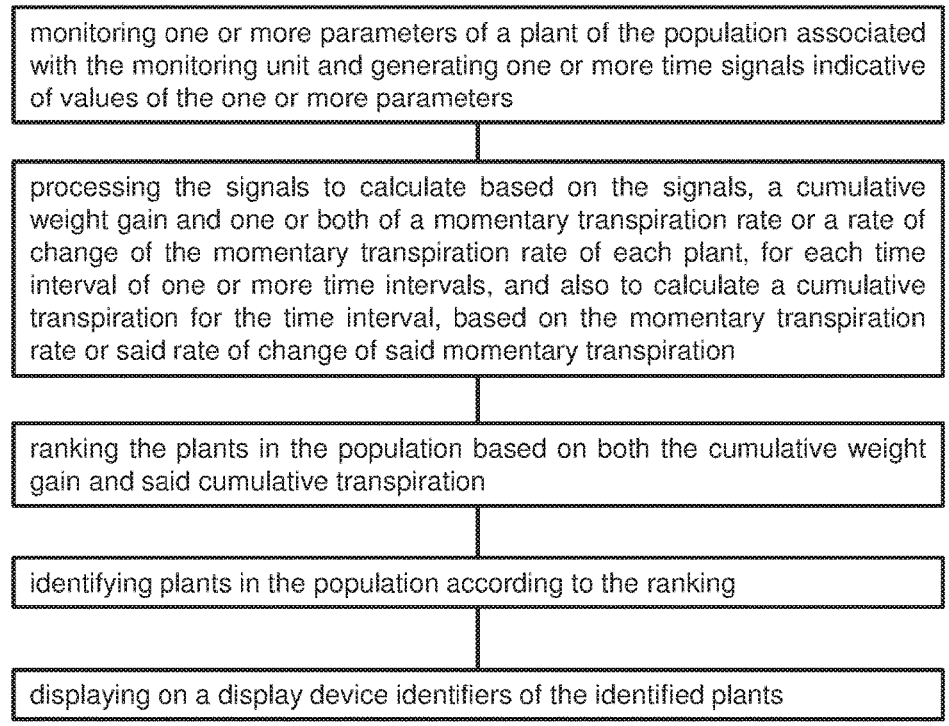
FIG. 13 is a flowchart describing a method suitable for identifying one or more plants in a population of two or more plants, according to some embodiments of the present invention.

FIG. 11 shows a system 1, in accordance with the invention for simultaneously monitoring transpiration rates in a population of two or more plants and identifying those plants in the population having superior characteristics. The system 1 comprises two or more monitoring units 2, where each monitoring unit 2 serves to monitor the transpiration rate in a respective plant 4. For simplicity, and by way of example only, two monitoring units, 2a and 2b are shown in FIG. 11. Typically, the system 1 will be configured to include a number of monitoring units 1 equal to the number of plants in the population to be monitored.

Each monitoring unit 2 includes one or more sensors 6 sensing one or more parameters related to the plant. Each sensor 6 generates a time dependent signal indicative of the measured parameter parameters sensed by the sensor, which is transmitted to a processing station 8 for further processing as, explained below. Communication between a sensor 6 and the processing station may be via a wired communication channel, as shown in FIG. 11, where each of the sensors 6 is connected to the processing station 8 by a respective wired communication line 10. Alternatively, the sensors may communicate with the processing station 8 over a wireless communication channel. In a preferred embodiment shown in FIG. 11, the plants 4 are potted plants, and each pot 12 is enclosed in a container 14. The containers 14 are shown in FIG. 11 in a cut-away view in order to reveal the pot 12 and the portion of the plant 4 contained in the container 14. Each pot 12 contains a growth medium that may be solid, such as soil or an artificial growth medium, or may be a liquid as in the case of hydroponic plant growth.

Each container 14 contains an amount of water 18 that is in fluid communication with the contents of the pot 12 via holes 16 in the pot 12. In this preferred embodiment, the sensors 6 are load cells measuring a mass of the container 14 together with the contents of the container, including the water 18. Transpiration by a plant 4 causes the amount of water 18 in the container 14 to decrease over time which is reflected in a decrease in the mass sensed by the sensor 6. Once a day (usually at night when the transpiration rate is very low) the containers are filled with water to a predefined level (system preset). Depending on the applied stress, the container will not be filled along a drought stress period, will be filled with salty water during the salinity stress, and so on. The pots 12 are covered with a cover 20 through which the stem 22 of the plant passes in order to reduce or prevent evaporation of water from the contents of the pot. Similarly, each container 14 is covered with a cover 24 through which the stem 22 passes in order to prevent evaporation of water from the container 14. Thus by monitoring the mass of the container 14 over a period of time, a transpiration rate over the time period can be calculated at the processing unit 8, as explained below.

Load cells 6 may also be used to monitor a mass of the pot 12 together with its contents including the plant 4. As the plant 4 grows, the mass of the plant increases, and by monitoring the mass of the pot 4, so that monitoring the mass of the pot 12 over a time period allows a growth rate, and hence yield, of the plant to be calculated over the time period at the processing unit 8, as explained below.

The system 1 further comprises a device 26 to determine atmospheric demand for water. The device 26 comprises a wick 28 preferably made from a woven fabric. A portion of the wick 28 is submerged in water 30 in a container 32. Most of the wick is exposed to ambient air so that water absorbed into the wick 28 from the container 32 can evaporate off of the wick. The device 26 further comprises a sensor 34 which is a load cell monitoring a mass of the container 32 and it contents. The load cell 34 generates a time dependent signal indicative of the mass of the container and its contents that is communicated to the processing station 8 over a communication channel 36 that may be a wired channel or a wireless channel. The container 32 is filled daily by water to a predefined level.

The system 1 may include additional sensors such as sensors to monitor canopy temperature over time, the water content or the water potential in the pots.

As stated above, each of the sensors 6 and 34 generates a time dependent signal that is communicated to the processing station 8. The processing station 8 includes a CPU 38 including a multiplexer 40 that sequentially sends each of the input signals to an analog to digital converter 42 that samples the input signals at predetermined times and at predetermined frequencies. The sampling frequency may be for example, every 12 hours, more preferably, more preferably, more preferably, even more preferably, still more preferably, every two hours, every hour, every 10 minutes, 5 minutes or every 20 minute, every 30 seconds or every 10 seconds. A higher sampling frequency allows a shorter sampling time that tends to reveal the momentary transpiration rate that includes oscillations in the transpiration rate that might otherwise be overlooked with lower sampling frequencies. The samples of the digitized signals are time stamped by means of a clock 43, and the time stamped samples are stored in a memory 44 of the CPU. Each signal is stored in a file 45 in the memory 44 that is addressable by an identifier of the monitoring unit at which the signal was generated. The CPU contains a processor 46 configured to process the signals stored in the memory 44. The processing preferably includes filtering device-related noise from the signals. For the signals generated by the load cells 6, the processing will include calculating a transpiration rate by the plant 4 of the monitoring unit, for example, by calculating a time derivative of the filtered signal. The processing may also include calculating a growth rate of the plant 4 at the monitoring unit, for example, by calculating a time derivative of the signal. The processing may also include comparison of a calculated transpiration rate with an evaporation rate from the wick 28. The processing may also include calculating a ratio between each plant's transpiration rte with its growth rate.

The processing station 8 also includes user input device 48 that may be keyboard 50 or a computer mouse 52 that allows the user it input into the memory 44 any relevant information, such as an identifier of the plants at each of the monitoring units, the environmental conditions under which the signals were obtained. A display device, such as a CRT screen, 54 serves to display any of the input signals or the results of any of the processing.

In accordance with the invention, the processing of the signals is performed over each of two or more time periods. Typically, each of the two or more time periods is characterized by a set of one or more environmental conditions to which the plant population is exposed. During one time period, the environmental conditions may be "control" environmental conditions, while during another time period the environmental conditions may be "stress" conditions. The system 1 may thus further comprise means for generating desired conditions in the environment of the plants 100. Such means may include means for generating a desired temperature 102, humidity 104, water salinity 106, and so on.

The processor 46 may be configured to normalize the transpiration rates to the surface area of the leaves of each plant, or to the density of stomata in the leaves, with a normalizer 108. The surface area of a leaf may be determined using a scanner as is known in the art.

For each time period, the processing may include calculating an average and standard deviation of the transpiration rates, or the ratio between the transpiration rate and the growth rate, observed in the population over the time period. The processing may further include ranking each of the plants in the population according to the statistical analysis, for example, ranking the plants according to their transpiration rate or according to their ratio of their rates of transpiration and growth.

EXAMPLE

An experimental study was conducted using the system of the invention in greenhouses at the Faculty of Agricultural, Food and Environmental Quality Sciences, Rehovot, Israel. The system included 3.9 liter growing pots that were placed on temperature-compensated load cells (Tadea-Huntleigh, Israel) that were connected to a CR10 data logger (Campbell, scientific inc. USA). The pots were filled with a commercial growing media (a mixture of peat and tuff scoria) and a single plant was grown in each pot. Each pot was immersed in a plastic container (13×21.5×31.5 cm H W L) through a hole in a top cover of the container. The tops of the pots and the containers were sealed by aluminum foil to prevent evaporation. Under conditions of high irrigation, the container was filled daily to a height of 2 cm above the pot base Irrigation with excess water tended to leach salts accumulated in the growing media during each day. A commercial fertilizer solution 0.2% (Super Grow, Hortical Israel) was added to the irrigation water, a process referred to herein as "fertigation". Fertigation ensures that a) the plants are not subjected to water stress, and b) the container-weight during day decreases monotonically only by plant transpiration.

Pot weight readings, taken every 10 s, were averaged over 3-min periods. This averaging period is lower than the oscillation frequency (20 to 40 min) and is higher than the Nyquist frequency (the highest frequency about which meaningful information can be obtained from a set of data), and was found to have a minor effect on the oscillations. The load-cell readings stabilized after 2 s, following excitation by dropping a 70 gr steel ball from a height of 700 mm (manufacturer's data). Thus, a 10 sec weight-sampling interval ensured that the maximum rate of weight decrease of 0.5 g per 10 sec was appropriately followed.

In order to identify and isolate any noise introduced by the measuring and data acquisition systems from short-term fluctuations in plant transpiration rates, a constant weight of about six kg (about equal to the mass of the container+pot+plant) was placed on load-cells in the greenhouse for two days.

Plants.

Tomato plants (*Solanum lycopersicom* previously known as *Lycopersicon esculentum* L.) were grown in both controlled-environment and commercial greenhouses in a light cycle consisting of 14 h light and 10 hours dark. The temperature in the controlled environment greenhouse was 18° C. during the night hours and 35° C. during the midday hours, gradually varying between these two extreme temperatures. The ambient conditions in the commercial greenhouse were controlled by a fan with a wet-mattress. Abscisic acid (ABA) deficient lines sitiens cultivar (Ailsa Craig the background as near-isogenic lines, the kind gift of Dr. Andrew J. Thompson) and the poplar plants (*Populus alba*) were grown in the commercial greenhouse. Four month old shoots re-grown from one year old poplar plant cuttings (about ten centimeters above the growing media surface) were used in these experiments.

Cut tomato shoot experiments were performed by excising the root of two wild type tomato plants out of five plants that had been placed on the load cells. The root removal was done while submerging the plant in tap water in the evening in order to prevent penetration of air bubbles into the xylem. The tomato shoot was then immersed in a container containing 2 liters of tap water that was placed on the load cell. The dehydration conditions were created by stopping the irrigation for six days.

Leaf area measurements; tomato leaves were cut immediately after the experiment ended and scanned using an automatic scanner (Li cor, model Li 3100 area meter). The poplar leaf area was measured without excising the leaves using a portable leaf area scanner (Li cor, model Li-3000A)

Weight loss from a vertically hanging woven rag (0.14 m$^2$) whose lower end was dipped in water (referred to herein as the "wet wick") was measured. The rate of weight loss from the wet wick provided an assessment for the momentary atmospheric demand. The noise associated with the weight decrease of the wet wick was also used to indicate noise levels associated with the load-cell response to dynamic monotonic weight variation. The data from the load cells with plants, wet wick and constant weight data were analyzed by a time series analysis explained below.

Data Analysis

The rate of water loss from the container, being the negative value of the whole-plant transpiration (WPT) rate, is calculated by the first derivative of the measured-weight time series $$WPT \equiv -\frac{dW}{dt} \approx -\frac{W_{k+1} - W_k}{t_{k+1} - t_k} \qquad [1]$$

where $W_k$ and $W_{k+1}$ is the measured weight of the container at time $t_k$ and the subsequent time step $t_{k+1}$. In general, differentiation acts as a high-pass filter, and thus significantly amplifies the high frequency noise. Noise can be reduced or eliminated by smoothing (detrending) the measured data (time series) so that it becomes stationary prior to spectral analysis. The differentiation of a leading variation pattern provides a smoothed pattern WPT rate. Any method can be used for smoothing the data including non-parametric smoothing (e.g. moving average, Savitzky-Golay, and FFT filtering) and non-parametric regression (fitting polynomials of various orders, exponential functions, symmetrical and asymmetrical transition functions, etc. to the measured data).

It is assumed herein that the container-weight time series follows an additive model $$W_k = W(t_k) + \varepsilon_k, \quad 1 \le k \le n \quad t_1 < t_2 < \ldots t_k \ldots < t_n$$

where W is the weight at time $t_k$ would have if it varied smoothly with time, and $\{\varepsilon_k\}$ is the deviation from that value. The system weight oscillations superimposed on the smoothed time series are also a time series, and are designated as the 'residual time series' (residuals are the differences between the measured data and the fitted curve). When the mean of the residuals time series is zero, the trend of the measured time-series was properly removed. We presume that the residual time series $\varepsilon_k$ (Eq. 2) is a superposition of two time series; one is made of residuals that originate from the data acquisition and other system-related noises, $\varepsilon_{k_1}$, and the other from residuals originated from the intrinsic oscillations in WPT, $\varepsilon_{k_2}$. The independently measured time series for the constant weight, wet wick and plant runs were used to study the properties of $\varepsilon_{k_1}$ and $\varepsilon_{k_2}$ and examine their randomness (white noise) by the autocorrelation function.

The spectrum analysis of $\varepsilon_k$ was used to explore the existent of cyclical patterns. The spectral analysis decomposes a complex time series with cyclical components into a few underlying sinusoidal (sine and cosine) functions of particular wavelengths. By identifying the important underlying cyclical components, the characteristics of the phenomenon of interest could be realized, namely, identify the wave lengths and importance of underlying cyclical component in the WPT rate. This spectrum analysis reveals cycles of different lengths in the time series.

The spectrum (amplitudes vs. frequencies) of the residual time series was calculated by the Fast Fourier Transform (FFT), which decomposes a time-domain signal or time series into complex exponentials (sines and cosines). The spectrum of the constant-weight residual time series, $\varepsilon_{k_2}$, will be used to determine the frequency threshold that will be used to filter out the high frequency noises (low-pass filter) from the plant-weight residual time series, $\varepsilon_{k_1}$. Subsequently, the filtered spectrum is reconstructed back to a time series (in the time domain) by the inverse FFT. The time derivative of the reconstructed low-pass-filtered time series $\varepsilon_k'$/dt ($\varepsilon_k'$ is the low-pass filter of $\varepsilon_k$) provides the oscillatory transpiration rate that superimposes the smoothed WPT rate.

Example 1: Oscillations in Whole-Plant Transpiration (WPT) Rate

Figure 1A:
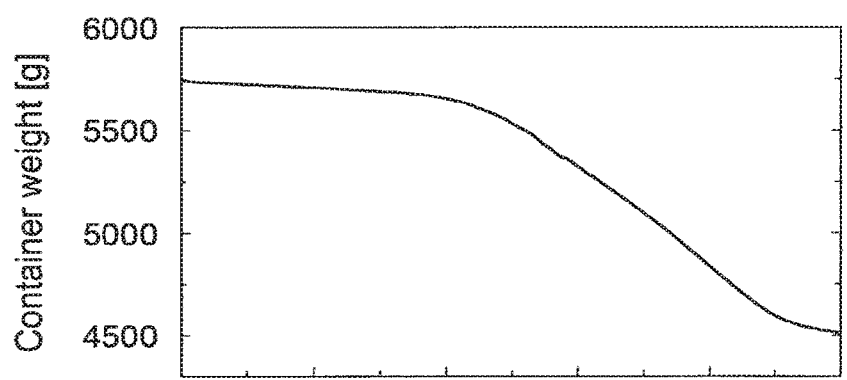
FIG. 1A shows weight variation of a control tomato plant grown in a temperature controlled greenhouse due to transpiration during the night and subsequent day hours.
Figure 1B:
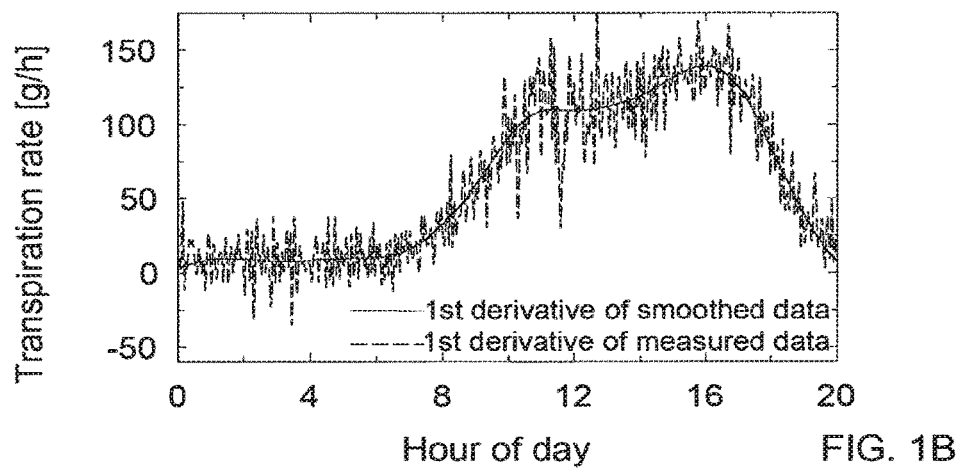
FIG. 1B shows the calculated WPT of the plant of FIG. 1A.

A typical measured weight variation by transpiration during the night and subsequent day hours is shown in FIG. 1A for a control tomato plant that was grown in the temperature-controlled greenhouse. The WPT rate was calculated by the time-derivative of the measured weight time series (Eq. 1) as shown in FIG. 1B. This time derivative is noisy despite the apparent relative smooth weight-decrease pattern (FIG. 1A). The noise amplitude was lower during the night and early morning hours, increased afterwards, reached a maximum during the late morning and early afternoon hours, and decreased again during the evening hours. Weight fluctuations around the smoothed pattern has usually been considered as a random signal (white noise) that does not contain useful information regarding the pattern of transpiration rate and its dependent on ambient conditions, and were therefore ignored during the data-smoothing process.

Alternatively, the WPT rate was calculated by first smoothing the weight time series and then calculating the time derivative (FIG. 1B). The measure-weight time series was smoothed by the Savitzky-Golay (S-G) method using a 30 data point window breadth. This smoothing method is based on a least-square quadratic polynomial (although higher orders can be also used) fitting across a moving window within the data. The S-G method can be applied for various breadths of filtering windows, and it is considered a very good way to produce accurate smooth derivatives, an advantage for the current study where the transpiration/evaporation rate were determined by a derivative of the weight decrease. Very high $R^2$ values were obtained with the S-G method for wide range of filtering window breadths, and the fit improves as the filtering window breadth is decreases. Nevertheless, as the filtering window breadth decreases, the predicted water uptake patterns include fluctuations of lower frequencies and higher amplitudes, and for very narrow windows $R^2 \to 1$, which means that the smoothed curve passes through all data points, and the pattern of the derivative is identical to that obtained by numerical differentiation of the measured data (FIG. 1B). The time-derivative of the data time series that was previously smoothed by S-G method with for a whole plant is shown in FIG. 1B.

Figure 2A:
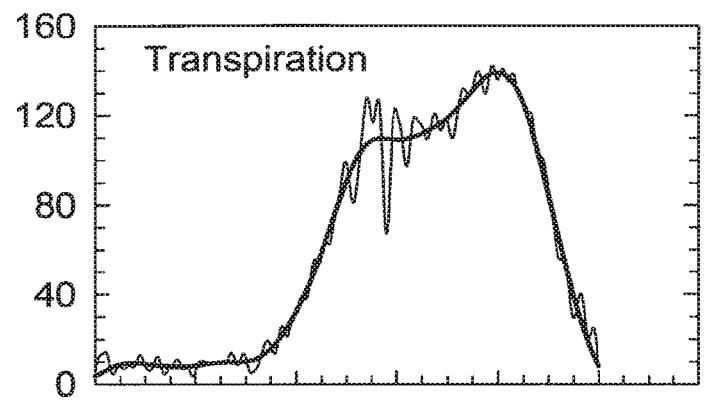
FIGS. 2A, 2B, and 2C shows the average and the superimposed oscillations in the rate of weight variation for a plant, wet wick, and constant weight, respectively.

The average and the superimposed oscillations in the rate of weight variation for the whole plant, wet wick, and constant weight are shown in FIG. 2A, B, C, respectively. The method to calculate the oscillatory transpiration rate is demonstrated in the sequel. The different oscillatory pattern for the whole plant, wet wick, and constant weight indicate that oscillations in WPT rate are indeed a physiological phenomenon, independent of noises in the load cell and data acquisition system or direct fluctuations in the ambient conditions.

To exclude the possibility that the oscillations in WPT rate are system and environmental noises, the residual (difference between the measured data and the data smoothed by the S-G method time series) for the whole plant, wet wick, and constant weight were examined for randomness (white noise) by calculating the autocorrelation of the signals. The autocorrelation functions for the three cases are shown in FIGS. 3A,C,E, respectively. The autocorrelation function of the controlled-weight residual time series, $\varepsilon_{k_1}$, (FIG. 3E) has a strong peak at lag=0 and is close to zero for all other lags. This shape indicates that $\varepsilon_{k_1}$ can be considered as white noise. On the contrary, the autocorrelation function of the whole-plant residual time series, $\varepsilon_{k_2}$, (FIG. 3A) is periodic for the first 200 lags, with an average of 40 lags difference from peak to peak. This indicates that the whole-plant residual time series is distinguishable from white noise. The autocorrelation function of the wet wick (FIG. 3C) indicates that residual time series for this data is not random as well. The deviation from randomness in this case can be related to changes in the ambient conditions in the greenhouse. The notable differences between the autocorrelation functions for the whole plant and the wet wick (FIGS. 3A and C, respectively) and between both and that of the constant weight (FIG. 3E) indicate that the residual time series of the whole plant contains a non-random noise associated with oscillatory plant transpiration pattern that superimpose the smoothed weight decrease pattern, beyond the superimposed fluctuations in wet-wick evaporation.

Figure 2B:
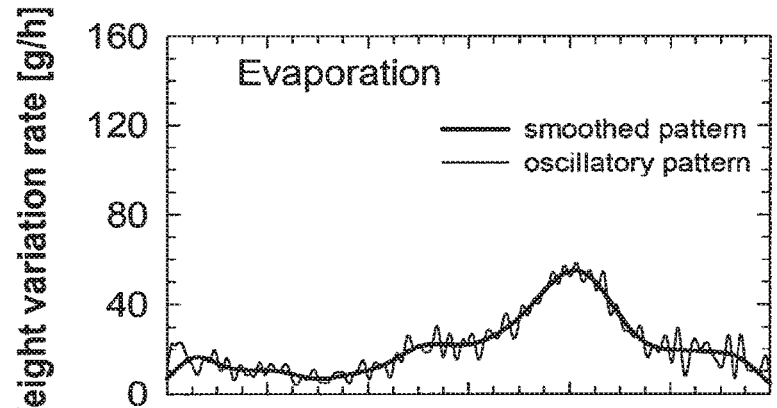
Figure 2C:
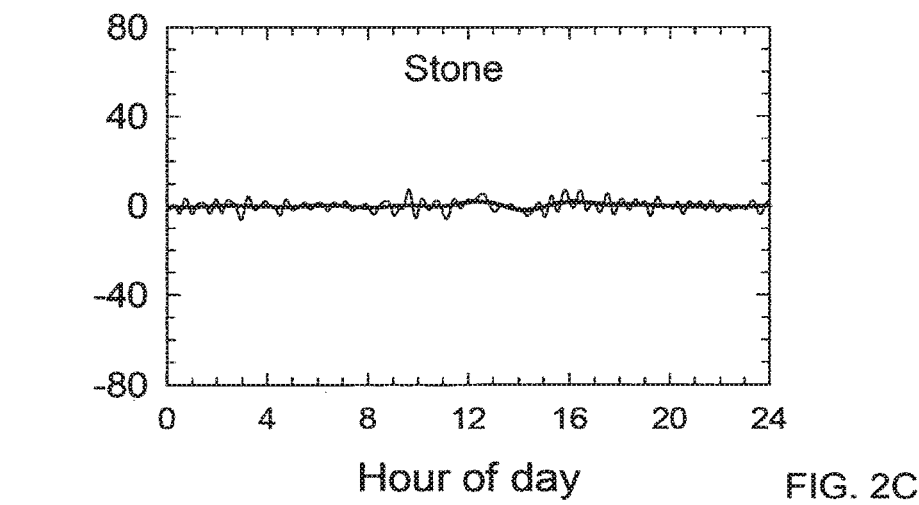

An additional test for randomness is the spectral analysis that was also used to filter the white (random) noises from the "colored" noises. The spectra for the whole-plant, sub-merge-wick, and constant-weight residual time series are shown in FIGS. 3B, D, and F, respectively. The overall flat spectrum of the constant-weight (FIG. 3F), indicates that its residual time series is practically a random signal (white noise). The spectrum for the whole plant (FIG. 3B) has high amplitudes at frequencies below 2.5 $h^{-1}$ and lower amplitudes at higher frequencies. The wet-wick spectrum has high amplitudes (still lower than the whole plant) at frequencies below 2 $h^{-1}$ and lower amplitudes at higher frequencies. In order to filter the white noise, both spectra were low-pass filtered using a cut of filter passing frequencies below 2 $h^{-1}$ prior to further analysis. The time derivative of the reconstructed low-pass filtered residual time series revealed oscillations in WPT rate for the plants and in the evaporation rate of the wet wick that superimpose the average transpiration/evaporation rates, respectively (FIG. 2A,B). Similar results as in FIGS. 2 and 3 were obtained for different days and plants for different ambient conditions.

The Effect of Drought on Oscillations in WPT Rate Pattern

Figure 4A:
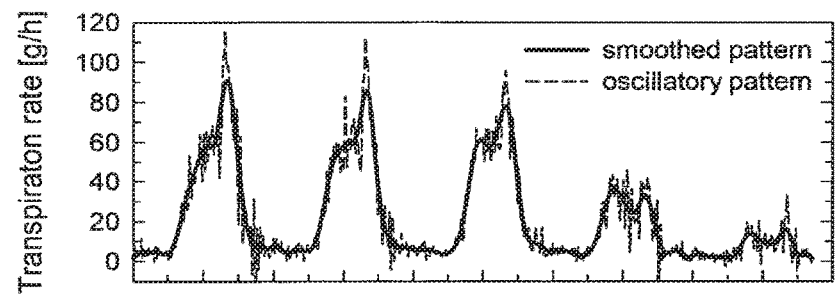
FIG. 4A shows the effect of five days of dehydration on the momentary WPT rate (smoothed oscillatory)
Figure 4B:
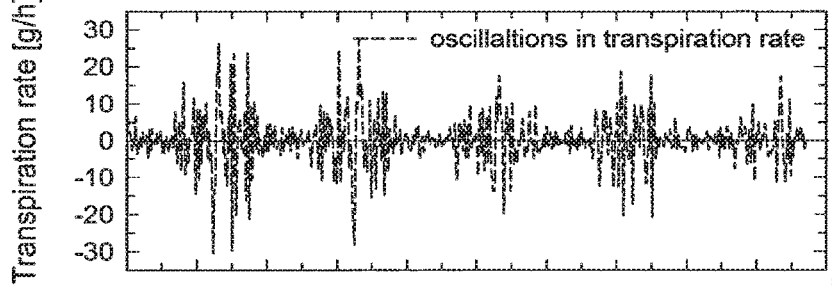
FIG. 4B shows the oscillation patterns observed in the WPT rate superimposed on the smoothed pattern of FIG. 4A.
Figure 4C:
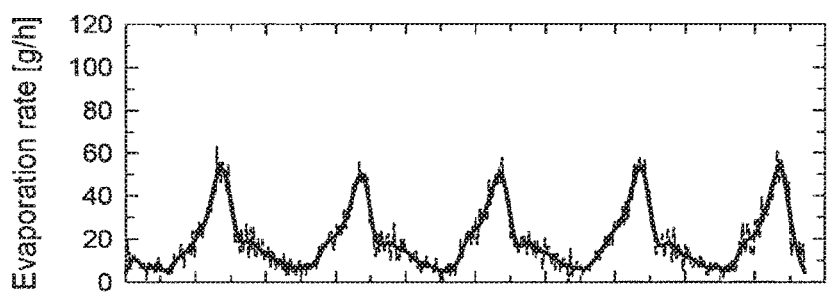
FIG. 4C shows the smoothed and oscillatory evaporation rate from the wet wick.
Figure 4D:
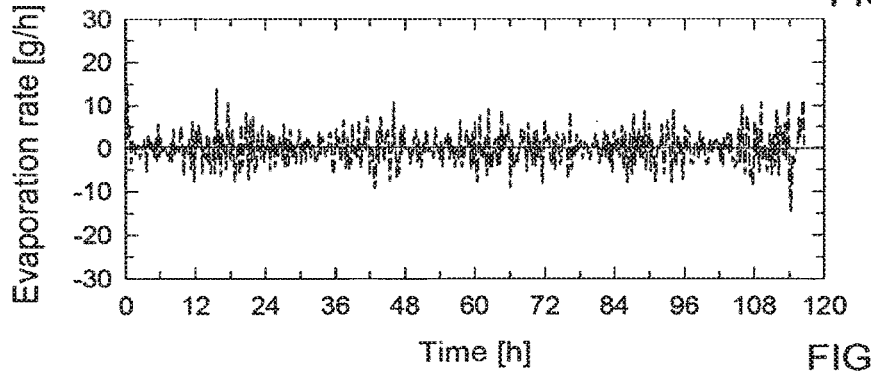
FIG. 4D shows the oscillation pattern in evaporation superimposed on the smoothed pattern of FIG. 4C.

The effect of five days of dehydration, obtained by a gradual depletion of the water in the growing medium, on the momentary WPT rate (smoothed oscillatory) is shown in FIG. 4A. The oscillation patterns observed in the WPT rate that was superimposed on the smoothed pattern in FIG. 4A are individually shown in FIG. 4B. The last irrigation was provided on the evening proceeding the first day in FIG. 4. For comparison, the smoothed and oscillatory evaporation rate from the wet wick are shown in FIG. 4C and the oscillation pattern in evaporation that was superimposed on the smoothed pattern in FIG. 4C are individually shown in FIG. 4D. FIG. 4 shows that: 1) Water was available to the plant during the first two days to meet the atmospheric demand and the characteristic patterns of the smoothed and oscillatory WPT rate are similar to those shown in FIG. 2A. The smoothed transpiration rate pattern has two peaks during each day (FIG. 4A); a lower peak in the morning and a higher peak in the afternoon. 2) The transpiration rate substantially decreases during the last two days, due to water depletion in the growing medium. The two peaks on each of these days had similar heights with a noticeable dip between them. As opposed to the daily two-peak pattern in the whole plant, there was one peak of a constant value in the smoothed wet-wick evaporation rate (FIG. 4C). The timing of the single daily peaks coincided with the second peak in the smoothed WPT rate. 3) The oscillation pattern in WPT rate is substantially different than that of the wet-wick evaporation rate which had uniform amplitude values during the day hours that were slightly different than those of the night hours (FIGS. 4C, D). In contrast, the daily oscillation pattern for the WPT rate varied significantly with time. It was low during the nigh hours, started to increase at about 9:00 AM, intensified toward midday and early afternoon at which time the VPD and transpiration rate were high, and gradually decreased during the later afternoon hours (FIGS. 4A, B). The substantial difference in the oscillation amplitudes between WPT and evaporative rates among the day and night hours (FIGS. 4B and D, respectively) indicates that the oscillation in WPT rate is an intrinsic physiological process associated with varying ambient environmental conditions. 4) The amplitude of the oscillations in WPT rate depended on water availability, as can be seen in the last two days in FIG. 4A, B. Their value relative to the smoothed transpiration rate during the midday hours were much higher than during the first three days. 5) Unexpectedly, oscillatory night transpiration rate patterns were observed (FIGS. 4A, B); it was higher during the first three nights and approached zero during the subsequent two nights.

Whole Plant vs. Excised Shoot

Figures 5A, 5B, 5C, 5D, 5E, 5F:
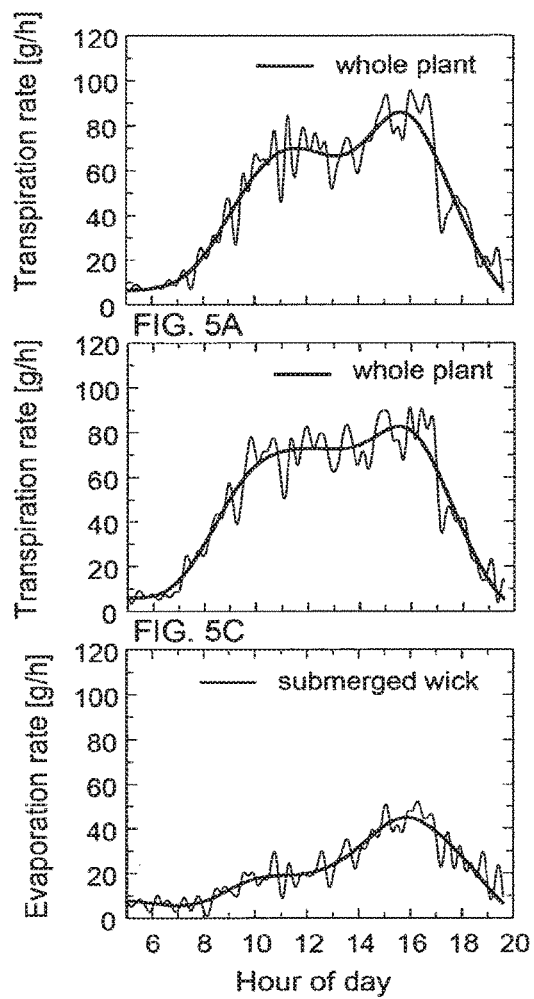
FIG. 5 shows the smoothed WPT rate and the superimposed oscillations for a typical tomato whole plant, excised shoot, and evaporation rate and the superimposed oscillations for the wet wick.

The smoothed WPT rate and the superimposed oscillations for a typical tomato whole plant, excised shoot, and evaporation rate and the superimposed oscillations for the wet wick are shown in FIG. 5. FIG. 5D show results for the shoot of the "mother" plant whose results are shown in FIG. 5C. As opposed to the two-peaks daily pattern of the smoothed WPT rate (FIGS. 2, 4, and 5A-C), the smoothed transpiration rate pattern for excised shoot (FIG. 5D) had a single peak in the morning that followed by a monotonic decrease in transpiration rate. As seen before (FIGS. 2 and 4A), the daily second peak in WPT rate coincided with the single peak of the wet wick (FIG. 5E, F). Note that the single peak in FIG. 5D is higher than the momentary transpiration rate of the whole plant at that time (FIG. 5B), and at the same time on day before (FIG. 5A, C), probably due to the root resistance to flow in the whole plant. The oscillations pattern and amplitudes in shoot transpiration rate (FIG. 5D) were in general similar to those obtained for the evaporation rate from the wet wick (FIG. 5E, F) and both are lower than those of the WPT rate (FIG. 5A-C).

ABA Deficient Mutants

Figure 6A:
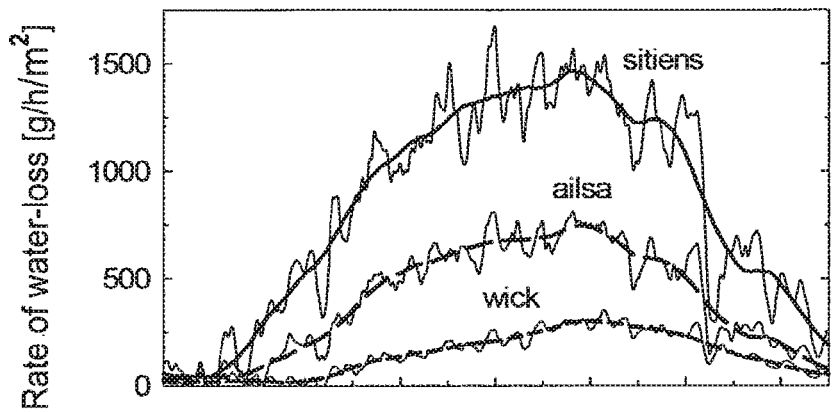
FIG. 6 shows representative results of oscillatory and smoothed WPT rate for an ABA-deficient sitiens plant and a control plant and evaporation rate and the superimposed oscillations for the wet wick.
Figure 6B:
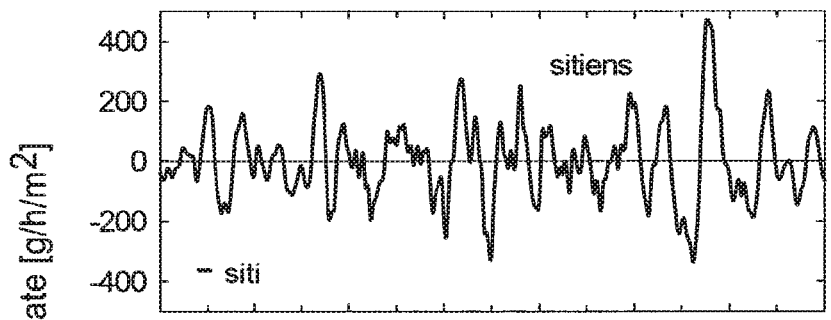
Figure 6C:
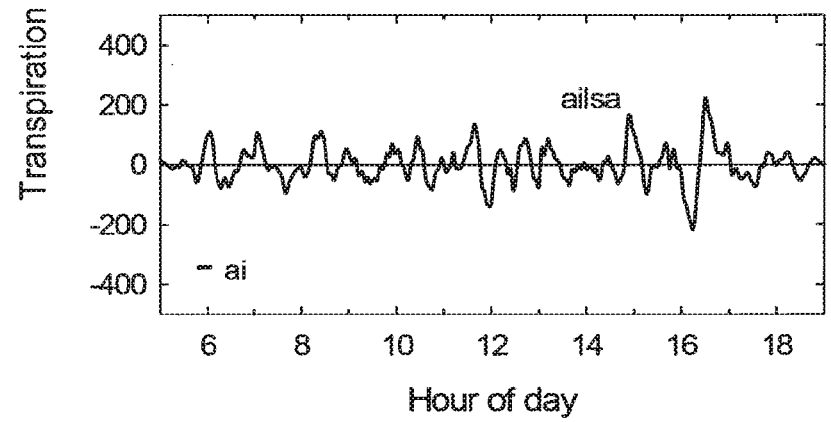
Figure 7A:
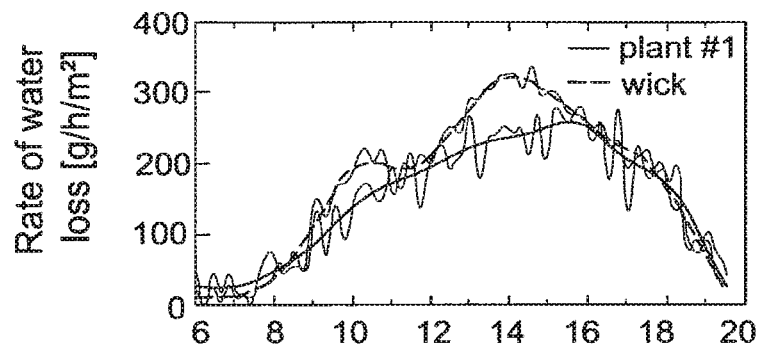
FIG. 7 shows representative results of oscillatory and smoothed WPT rate for two poplar (*Populus alba*) plants and the evaporation rate and superimposed oscillations for the wet wick.
Figure 7B:
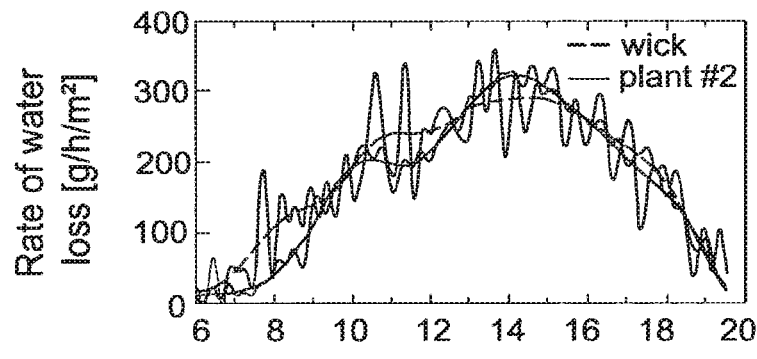
Figure 7C:
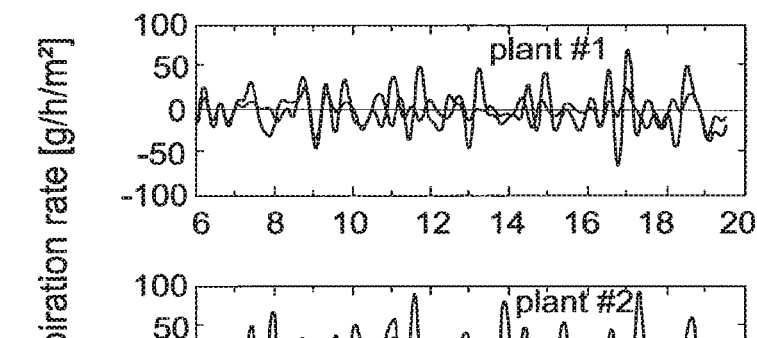
Figure 7D:
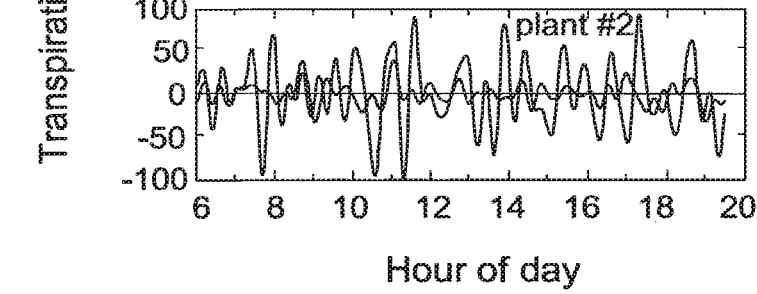

Representative results of oscillatory and smoothed WPT rate for an ABA-deficient sitiens plant and a control plant and evaporation rate and the superimposed oscillations for the wet wick are shown in FIG. 6. Since two different plants are compared, the transpiration rate was normalized to the leaf area of the individual plant and the wet wick to its own surface area. The sitiens mutants, shows significantly higher daily transpiration rate when compare to control (FIG. 6A). These plants show unique and much higher amplitudes and frequency oscillations pattern compared to the control plants. These oscillations started at dawn and persisted throughout the day (FIGS. 6B and C). Although the sitiens plants lose turgor around nine AM in the morning it continued to transpire through the day, and retain turgidity during the night.

Comparison with Poplar as a Higher Xylem-Vulnerable Plant

Representative results of oscillatory and smoothed WPT rate for two poplar (*Populus alba*) plants and the evaporation rate and superimposed oscillations for the wet wick are shown in FIG. 7. The transpiration rate was normalized to the leaf area of the individual plants. The relative low transpiration rate of poplar was (approximately the same as wick) due to their small size (FIG. 7). The oscillations pattern of poplar plants differed substantially from those of control tomato plants (FIGS. 2, and 4-6) but was similar to those of sitiens plant (FIG. 6). As could be detected from the post-dawn oscillations in WPT (FIG. 7), the oscillations had intensified and kept the same pattern throughout the day hours. This transpiration rate pattern (including oscillations) could be related to the differences in the cavitation vulnerability stress between tomato and poplar.

Example 2: Testing Isogenic Tomato Mutations for Transpiration Patterns

The method of the invention was used on an isogenic tomato 'Mutation Library' in the genetic background of the inbred variety M82. Field prescreening of this library yielded 29 mutants lines that showed a wilting response even under well watered nutrient-supply conditions. The amount of members in each line varied from 1 to 11, all together 350 individuals.

The screening method included six highly sensitive, temperature-compensated load cells (weighing lysimeters) that were connected to a data-logger and sampled every 3 minutes. Single potted plants were located on the load cells for 1-2 days. The time was decided upon the ability to identify the transpiration pattern of the tested mutants compared to control plants and submerged wick (proving information on the atmospheric demand). Evaporation from the pot surface was prevented by covering the growing-medium surface with an aluminum foil. The plants were fertigated every evening. The pots were submerged in container in order to keep constant water availability to the roots. From 350 plants, two individual plants representing two mutant lines were identified The two plants (chosen from the 42 plants on the array which are simultaneously monitored in the greenhouse) present two different patterns of transpiration rate (strategies) during the drought treatment. This figure presents one of the five criteria used by PLANTarray during the high-throughput selection process (see Materials and Methods).

Figure 8A:
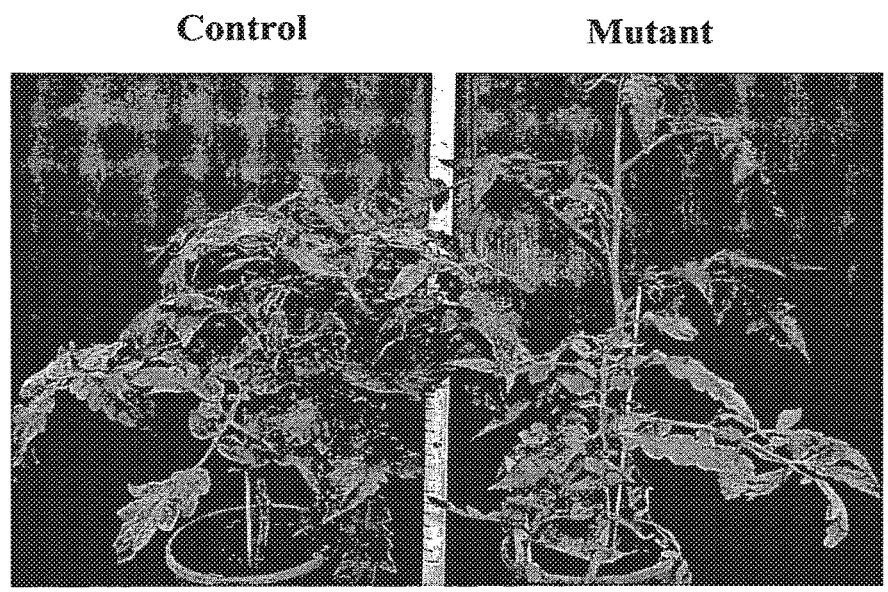
FIG. 8 shows a control plant and a mutant plant.
Figure 8B:
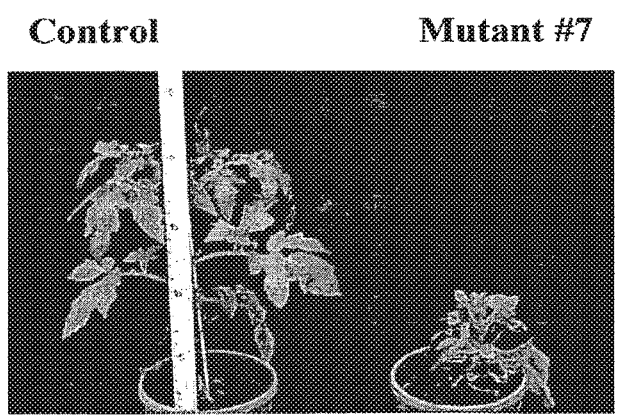
Figure 9A:
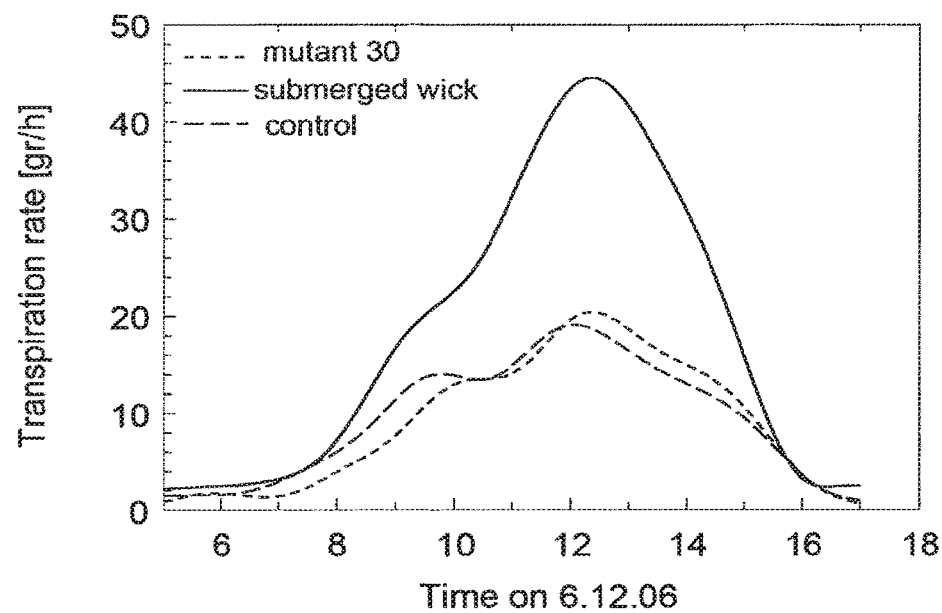
FIG. 9a shows transpiration from the control plant of FIG. 8
Figure 9B:
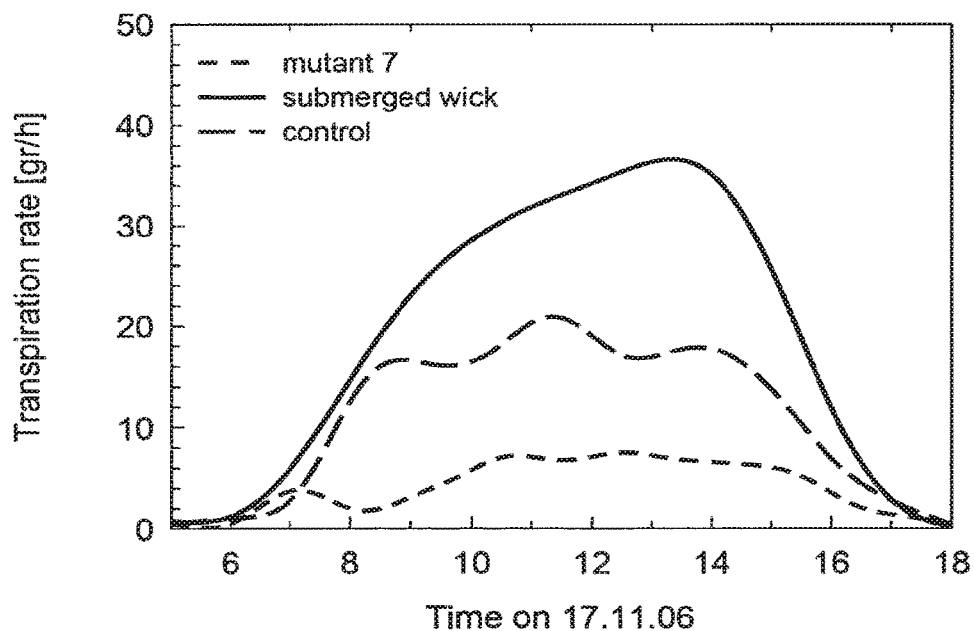
FIG. 9b shows transpiration from the mutant plant of FIG. 8.
Figure 10:
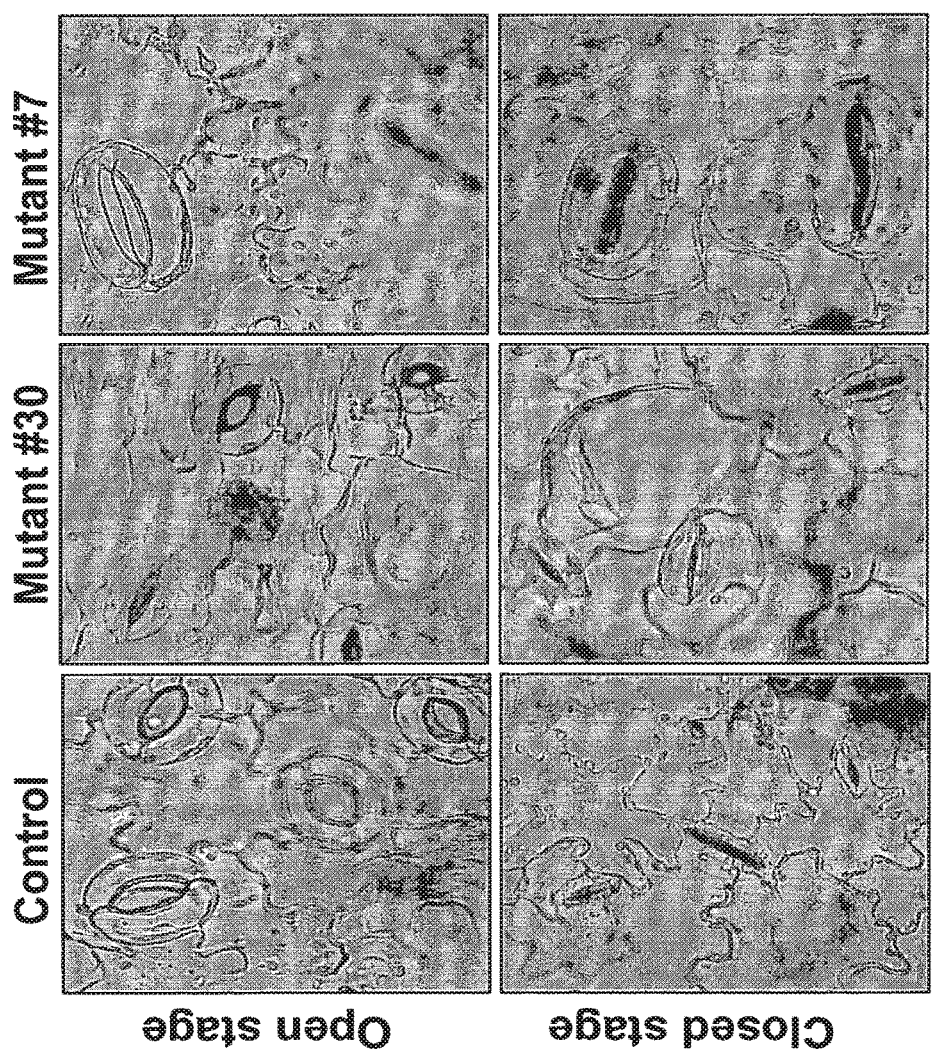
FIG. 10 shows stomata pore size in the control plant and mutant plant of FIG. 8.

Mutant #30, with a leaf area 40% lower than the control plant (FIG. 8) transpired similar water amounts (FIG. 9a), namely higher transpiration rate per leaf-area unit. Mutant #7, with a much smaller leaf area than the control plant (FIG. 8) transpired much less than the control (FIG. 9b). Looking for the causes of the transpiration differences among the mutants, we found significant changes in stomata pore size (FIG. 10) and density. The mean number of stomata of mutant #7 were significantly lower (11±0.16; Mean±SE, N=29) per 0.1 (mm)2 leaf size in compare to control (17±0.14; Mean±SE, N=29) while the other mutant (#30) had significantly higher number of stomata (23±0.16;

Mean±SE, N=29) per 0.1 (mm)2 leaf. The mean stomata pore size of mutant #30 were significantly smaller (11.86±6.3; Mean±SE, N=29) in compare to control (26.94±12.4; Mean±SE, N=29) where the mutant #7 mean stomata pore size were significantly higher (66±12.4: Mean±SE, N=29; P value=0.001).

These results allowed the identification of stomata-defective mutants in a population of 350 plants after about 8 weeks of monitoring which is significantly shorter than conventional field screening methods.

The invention claimed is:

1. A system for identifying one or more plants in a population of two or more plants in an environment, comprising:
   (a) two or more monitoring units, each plant being simultaneously monitored, before and after an environmental change, as a whole plant, by a monitoring unit, each monitoring unit comprising:
   (i) a pot for holding a plant from the population;
   (ii) a container configured to contain water and to receive said potted plant, said container being covered with a cover to reduce or prevent evaporation of water out of said container, wherein a stem of the plant passes through said cover; and
   (iii) one or more sensors configured to sense a weight of the whole plant and to transmit one or more time dependent signals indicative of values of said weight;
   (b) a display device; and
   (c) a processor configured to:
   (i) receive the time dependent weight signals from the monitoring units, and to process the signals to calculate, based on said signals, a cumulative weight gain and one or both of a momentary transpiration rate or a rate of change of the momentary transpiration rate of each plant, for each time interval of one or more time intervals, and also to calculate a cumulative transpiration over a time period, based on said momentary transpiration rate or said rate of change of said momentary transpiration;
   (ii) rank the plants in the population based on both said cumulative weight gain and said cumulative transpiration for at least one time interval before said environmental change and for at least one time interval after said environmental change;
   (iii) identifying plants in the population according to said ranking; and
   (iv) displaying on said display device identifiers of the identified plants.

2. The system according to claim 1, wherein at least one of said pots is also covered with a cover through which a stem of a respective plant from the population passes.

3. The system according to claim 1, wherein the monitoring units comprise a sensor that is a load cell configured to measure a mass of the container and contents of the container.

4. The system according to claim 3, wherein the processor is configured to calculate said momentary transpiration rate or rate of change of said momentary transpiration rate from the time dependent signal generated by the load cell over each of the one or more time intervals.

5. The system according to claim 1, wherein the processor is further configured to calculate a water use efficiency defined as said cumulative weight gain divided by said cumulative transpiration, wherein said ranking is according to said water use efficiency.

6. The system according to claim 1, further comprising a device to determine atmospheric demand for water, the device generating a time dependent signal indicative of the atmospheric demand for water, wherein the processor is configured to receive the time dependent signal from the device, wherein the processor is further configured to calculate a ratio between the momentary transpiration rate with the atmospheric demand for water.

7. The system according to claim 6, wherein the device determining the atmospheric demand for water comprises (a) a wick, a container containing water, a portion of the wick being submerged in the water, and (c) a load cell monitoring a mass of the container and contents of the container.

8. The system according to claim 6, wherein the atmospheric demand for water determines an amount of water to be provided after an environmental change.

9. The system according to claim 1, wherein the processor is configured to normalize the momentary transpiration rates to a surface area of the leaves of each plant, or to the density of stomata in the leaves.

10. The system of claim 1, wherein said one or more time intervals are in a range of from 10 seconds to 12 hours.

11. A method for selecting one or more plants from a population of two or more plants, each plant associated with an identifier, the method comprising:
   filling a container of a monitoring unit with water to a predefined level;
   simultaneously monitoring, before and after an environmental change, a weight of each whole plant of the population with said monitoring unit, wherein said monitoring unit comprises:
   (i) a pot for holding a plant from the population;
   (ii) said container configured to contain water and to receive said potted plant, said container being covered with a cover to reduce or prevent evaporation of water out of said container, wherein a stem of the plant passes through said cover; and
   (iii) one or more sensors configured to sense said weight and to transmit one or more time dependent signals indicative of values of said weight;
   processing the signals from said monitoring unit by a processor to calculate, based on said signals, a cumulative weight gain and one or both of a momentary transpiration rate of the plant or a rate of change of the momentary transpiration rate of the whole plant, for each time interval of one or more time intervals, and also to calculate a cumulative transpiration over a time period, based on said momentary transpiration rate or said rate of change of said momentary transpiration;
   ranking the plants in the population based on both said cumulative weight gain and said cumulative transpiration for at least one time interval before said environmental change and for at least one time interval after said environmental change;
   selecting plants in the population based on said ranking; and
   displaying on a display device identifiers of the selected plants.

12. The method of claim 11, wherein said one or more time intervals are in a range of from 10 seconds to 12 hours.

13. The method of claim 11, wherein said at least one environmental change comprises an environmental stress, such that said subjecting said plants to said at least one environmental change comprises subjecting said plants to said environmental stress.

14. The method of claim 13, wherein said environmental stress comprises one or more of changed temperature, changed salinity, changed humidity, changed soil or changed water availability to the plant.

15. The method of claim 14, wherein said environmental stress comprises increased salinity, wherein each monitoring unit further comprises a container configured to contain water and to receive a potted plant from the population, and wherein salinity in said water in said container is increased for said environmental stress.

16. The method of claim 14, wherein said environmental stress comprises reduced water availability to the plant, wherein each monitoring unit further comprises a container configured to contain water and to receive a potted plant from the population, and wherein said water in said container is decreased or not refilled for said environmental stress.

17. The method of claim 16, further comprising providing a device to determine atmospheric demand for water, wherein an amount of water to provide to said container is determined according to said atmospheric demand.

18. The method of claim 14, wherein implementing said changed soil comprises changing at least one of soil mineral content or soil biotic content, or both.

\* \* \* \* \*